(No Model.)
J. C. HENRY.
UNDERGROUND ELECTRIC CONDUCTOR.
No. 508,613. Patented Nov. 14, 1893.
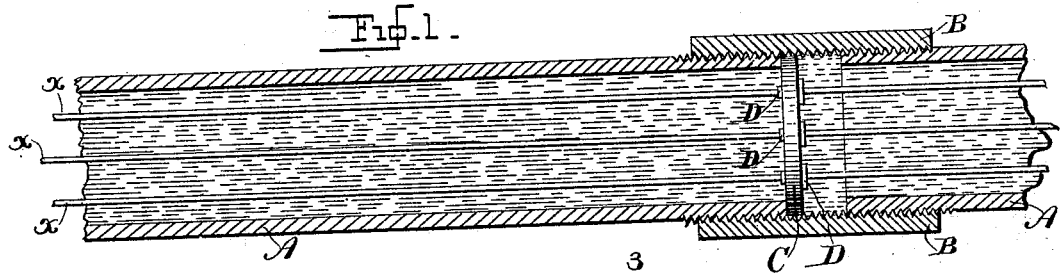
Fig. 1.
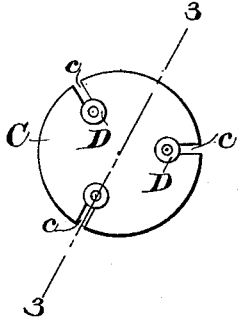
Fig. 2.
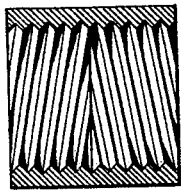
Fig. 6.
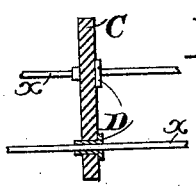
Fig. 3.
Fig. 4.
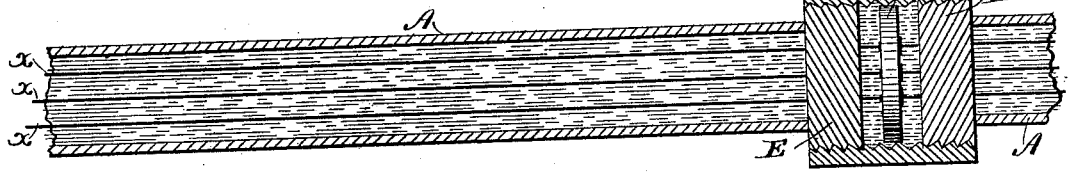
Fig. 5.
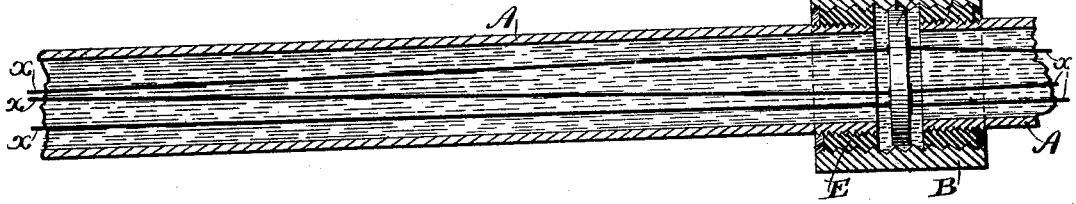
Witnesses
W. H. Courtland
A. O. Orne
Inventor
John C. Henry
THE NATIONAL LITHOGRAPHING COMPANY,
WASHINGTON, D. C.

UNITED STATES PATENT OFFICE.

JOHN C. HENRY, OF WESTFIELD, NEW JERSEY.

UNDERGROUND ELECTRIC CONDUCTOR.

SPECIFICATION forming part of Letters Patent No. 508,613, dated November 14, 1893.

Application filed August 8, 1892. Serial No. 442,428. (No model.)

*To all whom it may concern:*

Be it known that I, JOHN C. HENRY, a citizen of the United States, residing at Westfield, county of Union, State of New Jersey, have invented a certain new and useful Improvement in Electric Conductors, of which the following is a specification.

My invention relates to means for supporting and insulating electric conductors and to modes and methods of taking up slack in the same. It is applicable to conductors of various kinds, but is especially designed for those used in the three-wire parallel or the rotary phase current systems.

The objects of the invention are to thoroughly insulate and protect bare conductors, and to automatically or otherwise take up the slack due to variations in length when the conductor or its conduit expands or contracts under changes in temperature.

The invention consists in a conduit, composed of pipe sections, united by couplings, and preferably filled with oil. The bare conductors are stretched through the pipes, and are supported by insulating plates. The plates are rotatable around an axis parallel with, but at one side of, the conductors, and are preferably arranged to be automatically rotated by thermostatic devices when the temperature changes, so as to twist the conductors and take up the slack.

In the drawings Figure 1 is a top plan sectional view of my conduit. Fig. 2 is an elevation of an insulator. Fig. 3 is a cross section of the same on line 3—3. Fig. 4 is a section showing an automatic tension regulator, and Fig. 5 shows the action of said regulator. Fig. 6 is a sectional view showing the inclined planes which compose the tension regulator.

The conduit is preferably composed of iron pipes A, united by couplings B. Between the abutting ends of the pipe sections (and intermediately in the pipes if desired) are placed the insulating supports C, of glass or other suitable material. In each support are formed peripheral radial keyhole slots $c$, at equal distances apart. A metallic shouldered bushing or thimble D is received in the enlarged end of each slot, a wire $x$ passing through each thimble and being soldered thereto. The thimbles thus prevent the wires from either lateral or lengthwise movement in the supports C.

The wires are preferably of hard drawn copper and are bare. The pipe may be filled with oil to insulate the wires, or it may be left empty. The wires are stretched tightly and anchored at each end of the line. The frequency of the supports C prevents the wires from sagging under normal conditions. But since the rates of expansion and contraction of the pipes and wires are not equal, some means must be provided for taking up the slack in the wires when the pipes contract, and shorten in length. The devices by which I accomplish this are shown in Figs. 4 and 5. The adjacent ends of the pipe sections are provided with inclined planes, being preferably rigidly fastened into collars E, which have an external screw-thread of sharp pitch, one being right-handed and the other left-handed. These are united by a suitable threaded coupling B'. The insulating support C is attached to the coupling as by a pin F.

The operation of the device is as follows: When the pipe sections expand or contract by reason of changes in temperature, the collars are pushed into or drawn out of the coupling B', and the coarse threads compel the coupling to rotate about its axis, carrying the insulator C with it and twisting or untwisting the wires, as shown in Fig. 5; thereby increasing or decreasing their tension, and thus automatically taking up the slack.

What I claim as new, and desire to secure by Letters Patent, is—

1. A conduit for bare electric conductors, consisting of pipe sections united by suitable couplings, insulating supports placed at intervals in said pipe sections, and means for automatically taking up slack in the conductors, substantially as set forth.

2. The combination with an electric conduit, of an insulating support consisting of a disk of insulating material having radial key hole slots cut in its periphery, one or more bare electric conductors running through said slots and a shouldered metallic bushing fastened to each conductor and received in the enlarged end of each slot, substantially as described.

3. An automatic tension regulator for electric conductors, consisting of two inclosing pipes, a coupling uniting the same, a support for the conductors fastened to said coupling, and means whereby the coupling and support are caused to rotate when the pipes approach or recede from each other, substantially as set forth.

4. A conduit for electric conductors, consisting of two pipe sections, having inclined planes on their adjacent ends, a coupling having similar inclined planes meshing with those on the pipe sections, and a support for the conductors rigidly fastened to the coupling, substantially as described.

5. A conduit for electric conductors, consisting of two pipe sections having on their adjacent ends screw-threaded collars, a threaded coupling uniting the collars, and a support for the conductors fastened to the coupling, substantially as set forth.

6. The combination with two pipe sections having on their adjacent ends collars provided with screw-threads of sharp pitch, of a threaded coupling uniting said collars, and an insulating support fastened inside the coupling, substantially as described.

7. The combination with two pipe sections, having on their adjacent ends collars provided respectively with right and left hand screw-threads of sharp pitch, of a threaded coupling uniting said collars, and an insulating support inside the coupling, substantially as set forth.

8. The combination with an electric conductor, of rotatable supports for the same, and means for automatically rotating one or more of them to take up slack, substantially as set forth.

9. The combination with an electric conductor, of rotatable supports for the same, and thermostatic devices arranged to rotate one or more of said supports, to compensate for variations in the length of the conductor due to changes in temperature, substantially as described.

10. The mode of taking up slack in an electric conductor, which consists in attaching it to supports pivoted on an axis parallel with but at one side of said conductor, and then rotating one or more of said supports on said axis, substantially as set forth.

In testimony whereof I have hereto set my hand this 21st day of July, 1892.

JOHN C. HENRY.

Witnesses:
ALLEN C. FITCH,
L. M. WHITAKER.